(12) United States Patent
Beyers et al.

(10) Patent No.: US 7,020,205 B1
(45) Date of Patent: Mar. 28, 2006

(54) SENDING PROGRESSIVE VIDEO SEQUENCES SUITABLE FOR MPEG AND OTHER DATA FORMATS

(75) Inventors: Billy Wesley Beyers, Greenfield, IN (US); Wai-Man Lam, Mohegan Lake, NY (US)

(73) Assignee: Thomson Licensing, Boulogne-Billancourt (FR)

( * ) Notice: Subject to any disclaimer, the term of this patent is extended or adjusted under 35 U.S.C. 154(b) by 1046 days.

(21) Appl. No.: 09/614,632

(22) Filed: Jul. 12, 2000

(51) Int. Cl.
   *H04N 7/12* (2006.01)

(52) U.S. Cl. ............ 375/240.26; 375/240; 375/240.01; 375/240.12

(58) Field of Classification Search ............ 375/240.26, 375/240, 240.01, 240.04, 240.12, 240.15; 348/512, 554, 409.1; 708/203
See application file for complete search history.

(56) References Cited

U.S. PATENT DOCUMENTS

| | | | | |
|---|---|---|---|---|
| 5,231,484 | A | * | 7/1993 | Gonzales et al. ...... 375/240.04 |
| 5,410,354 | A | | 4/1995 | Uz ............................. 348/426 |
| 5,742,343 | A | * | 4/1998 | Haskell et al. ......... 375/240.15 |
| 5,844,636 | A | | 12/1998 | Joseph et al. ............... 348/845 |
| 5,852,565 | A | * | 12/1998 | Demos ....................... 708/203 |
| 6,043,846 | A | * | 3/2000 | Shen et al. ............. 348/409.1 |
| 6,125,140 | A | * | 9/2000 | Wilkinson .................. 375/240 |
| 6,323,909 | B1 | * | 11/2001 | Michener et al. ........... 348/512 |
| 6,337,716 | B1 | * | 1/2002 | Yim ........................... 348/554 |

FOREIGN PATENT DOCUMENTS

CN    1220800 A    6/1999

OTHER PUBLICATIONS

Okubo, S. et al.: "MPEG-2 requirements, profiles and performance verification—Framework for developing a generic video coding standard", Signal Processing, Image Communication, Elsevier Science Publishers, Amsterdam, NL, vol. 7, No. 3, Sep. 1, 1995, pp. 201-209, XP004047103.

Takahashi, H. et al.: "Single-Chip MPEG2 MP HL Decoder with Multi-Decode and Seamless Display Features", Fujitsu-Scientific and Technical Journal, Fujitsu Limited, Kawasaki, JP, vol. 36, No. 1, Jun. 2000, pp. 48-55, XP001108192.

Suguri, K. et al., "A Scalable Architecture of Real-Time MP@HL MPEG-2 Video Encoder for Multi-Resolution Video", vol. 3653, Jan. 27, 1999, pp. 895-904, XP001189206.

European Search Report dated May 10, 2004 Attached.

* cited by examiner

*Primary Examiner*—Allen Wong
(74) *Attorney, Agent, or Firm*—Joseph S. Tripoli; Ronald H. Kurdyla; Guy H. Eriksen

(57) ABSTRACT

In encoding and decoding video signals, a progressive video bitstream is received which has reference frames and non-reference frames, each having an initial temporal reference in accordance with an initial frame sequence structure. The temporal references of the only the reference frames are remapped, by ignoring the non-reference frames. The reference frames are packetized with a base packet-identifier (PID) and the non-reference frames with an enhancement PID, to provide base and enhancement transport bitstreams, respectively.

20 Claims, 3 Drawing Sheets

SENDING PROGRESSIVE VIDEO SEQUENCES SUITABLE FOR MPEG AND OTHER DATA FORMATS

BACKGROUND OF THE INVENTION

1. Field of the Invention

The present invention relates to video processing systems, and, in particular, to apparatuses and methods for encoding video sequences in a bitstream which is backward compatible for decoding into lower quality video by older decoders and which may be decoded into high-quality progressive video by newer decoders compatible with the high-quality encoding.

2. Description of the Related Art

Data signals are often subjected to computer processing techniques such as data compression or encoding, and data decompression or decoding. The data signals may be, for example, video signals. Video signals are typically representative of video pictures (images) of a motion video sequence. In video signal processing, video signals are digitally compressed by encoding the video signal in accordance with a specified coding standard to form a digital, encoded bitstream. An encoded video signal bitstream may be decoded to provide decoded video signals.

The term "frame" is commonly used for the unit of a video sequence. A frame contains lines of spatial information of a video signal. Depending on the encoding format, a frame may consist of one or more fields of video data. Thus, various segments of an encoded bitstream represent a given frame or field. The encoded bitstream may be stored for later retrieval by a video decoder, and/or transmitted to a remote video signal decoding system, over transmission channels or systems such as Integrated Services Digital Network (ISDN) and Public Switched Telephone Network (PSTN) telephone connections, cable, and direct satellite systems (DSS).

Video signals are often encoded, transmitted, and decoded for use in television (TV) type systems. Many common TV systems, e.g. in North America, operate in accordance with the NTSC (National Television Systems Committee) standard, which operates at $(30*1000/1001) \approx 29.97$ frames/second (fps). The spatial resolution of SDTV is sometimes referred to as SDTV (standard definition TV). NTSC originally used 30 fps to be half the frequency of the 60 cycle AC power supply system. It was later changed to 29.97 fps to throw it "out of phase" with power, to reduce harmonic distortions. Other systems, such as PAL (Phase Alternation by Line), are also used, e.g. in Europe.

In the NTSC system, each frame of data is typically composed of an even field interlaced or interleaved with an odd field. Each field consists of the pixels in alternating horizontal lines of the picture or frame. Accordingly, NTSC cameras output $29.97 \times 2 = 59.94$ fields of analog video signals per second, which includes 29.97 even fields interlaced with 29.97 odd fields, to provide video at 29.97 fps. NTSC images typically have a resolution of approximately 720 (h)×480 (v) active pixels. Thus, each field is 720×240, to provide interlaced frames of 720×480. These specifications are provided in CCIR Rec. 601, which specifies the image format, acquisition semantic, and parts of the coding for digital "standard" television signals. ("Standard" television is in the resolution of PAL, NTSC, and SECAM.)

Various video compression standards are used for digital video processing, which specify the coded bitstream for a given video coding standard. These standards include the International Standards Organization/International Electrotechnical Commission (ISO/IEC) 11172 Moving Pictures Experts Group-1 international standard ("Coding of Moving Pictures and Associated Audio for Digital Storage Media") (MPEG-1), and the ISO/IEC 13818 international standard ("Generalized Coding of Moving Pictures and Associated Audio Information") (MPEG-2). Another video coding standard is H.261 (P×64), developed by the International Telegraph Union (ITU). In MPEG, the term "picture" refers to a bitstream of data which can represent either a frame of data (i.e., both fields), or a single field of data. Thus, MPEG encoding techniques are used to encode MPEG "pictures" from fields or frames of video data.

MPEG-1 was built around the Standard Image Format (SIF) of 352×240 at 30 frames per second (fps). MPEG data rates are variable, although MPEG-1 was designed to provide VHS video quality at a data rate of 1.2 megabits per second, or 150 KB/sec. In the MPEG-1 standard, video is strictly non-interlaced (i.e. progressive). For progressive video, the lines of a frame contain samples starting from one time instant and continuing through successive lines to the bottom of the frame.

MPEG-2, adopted in the Spring of 1994, is a compatible extension to MPEG-1, which builds on MPEG-1 and also supports interlaced video formats and a number of other advanced features, including features to support HDTV (high-definition TV). MPEG-2 was designed, in part, to be used with NTSC-type broadcast TV sample rates using the CCIR Rec. 601 (720 samples/line by 480 lines per frame by 29.97 fps. In the interlacing employed by MPEG-2, a frame is split into two fields, a top field and a bottom field. One of these fields commences one field period later than the other. Each video field is a subset of the pixels of a picture transmitted separately. MPEG-2 is a video encoding standard which can be used, for example, in broadcasting video encoded in accordance with this standard. The MPEG standards can support a variety of frame rates and formats.

Motion compensation is commonly utilized in video signal processing. Motion compensation techniques exploit the temporal correlation that often exists between consecutive pictures, in which there is a tendency of some objects or image features to move within restricted boundaries from one location to another from picture to picture. In the MPEG standards, such as the MPEG-2 standard, there may be different picture or frame types in the compressed digital stream, such as I frames, P frames, and B frames. I frames, or intra-frames, are self-contained, that is, they are not based on information from previously transmitted and decoded frames. Video frames which are encoded with motion compensation techniques are referred to as predicted frames, or P frames, since their content is predicted from the content of previous I or P frames. P frames may also be utilized as a base for a subsequent P frame. I and P frames are both "anchor" frames, since they may be used as a basis for other frames, such as B or P frames which are predicted based on anchor frames. A "bidirectional" or B frame is predicted from the two anchor frames transmitted most recently relative to the transmission of the B frame. Other standards, such as H.261, utilize only I and P frames.

Most MPEG encoding schemes use a twelve- to fifteen-compressed frame sequence called a group of pictures (GOP). Each GOP typically begins with an I frame, and optionally includes a number of B and P frames. The parameter M is often used to represent the distance between P frames in a GOP, and the parameter N represents the total number of frames in a GOP (i.e., the distance between I frames in consecutive GOPs).

An MPEG bitstream typically contains one or more video streams multiplexed with one or more audio streams and other data, such as timing information. In MPEG-2, encoded data which describes a particular video sequence is represented in several nested layers: the Sequence layer, the GOP layer, the Picture layer, the Slice layer, and the Macroblock layer. To aid in transmitting this information, a digital data stream representing multiple video sequences is divided into several smaller units and each of these units is encapsulated into a respective packetized elementary stream (PES) packet. For transmission, each PES packet is divided, in turn, among a plurality of fixed-length transport packets. Each transport packet contains data relating to only one PES packet. The transport packet also includes a header which holds control information to be used in decoding the transport packet.

Thus, the basic unit of an MPEG stream is the packet, which includes a packet header and packet data. Each packet may represent, for example, a field of data. The packet header includes a stream identification code and may include one or more time-stamps. For example, each data packet may be over 100 bytes long, with the first two 8-bit bytes containing a packet-identifier (PID) field. In a DSS application, for example, the PID may be a SCID (service channel ID) and various flags. The SCID is typically a unique 12-bit number that uniquely identifies the particular data stream to which a data packet belongs. Thus, each compressed video packet contains a PID such as a SCID.

When an MPEG-2 encoded image is received by a video decoding system, a transport decoder decodes the transport packets to reassemble the PES packets. The PES packets, in turn, are decoded to reassemble the MPEG-2 bitstream which represents the image. A given transport data stream may simultaneously convey multiple image sequences, for example as interleaved transport packets.

For example, an MPEG-2 encoded video bitstream may be transported by means of DSS packets when DSS transmissions are employed. Most DSS video programs are encoded at 544 pixels/line and 480 lines/frame. All 29.97 frames/sec are coded. The exact number of coded frames/sec depends on the exact sequence. DSS systems allow users to receive directly many TV channels broadcast from satellites, with a DSS receiver. The receiver typically includes a small 18-inch satellite dish connected by a cable to an integrated receiver/decoder unit (IRD). The satellite dish is aimed toward the satellites, and the IRD is connected to the user's television in a similar fashion to a conventional cable-TV decoder. In the IRD, front-end circuitry receives a signal from the satellite and converts it to the original digital data stream, which is fed to video/audio decoder circuits which perform transport extraction and decompression. For MPEG-2 video, the IRD comprises an MPEG-2 decoder used to decompress the received compressed video.

In MPEG-2, four different "profiles" are defined, each corresponding to a different level of complexity of the encoded image, e.g. the image/picture resolution. Each profile define the colorspace resolution and scalability of the bitstream. For each profile, different levels are defined, each level corresponding to a different image resolution. The various levels for a given profile define the maximum and minimum for image resolution, and Y (luminance) samples per second, the number of video and audio layers supported for scalable profiles, and the maximum bit rate per profile. The combination of a profile and a level produces an architecture which defines the ability of a decoder to handle a particular bitstream.

The most common profile for broadcast applications is the main profile (MP) format. One of the MPEG-2 "standards," known as Main Profile, Main (or Medium) Level (MP@ML) is intended for encoding video signals conforming to existing SD television standards (i.e., NTSC and PAL). This standard may be used to encode video images having 480 active lines each with 720 active pixels with a 2:1 interlace scan. When the horizontal and vertical blanking intervals are added to these signals, the result has 525 lines by 858 pixels. When they are decoded, and displayed with a 13.5 MHz display clock signal, these signals produce images that correspond to NTSC-type broadcast images. Another standard, known as Main Profile, High Level (MP@HL), is intended for encoding HDTV images.

As the quality of some systems such as TV systems improves, it is desirable to provide HD-compatible encoded video signals for video transmissions. However, there may be both SD and HD receivers, and the SD receivers and systems may not be compatible with the improved transmission/encoding standard, i.e. the improved standards may not be "backward-compatible". For example, conventional SD DSS IRDs are not able to decode any formats better than MP@ML formats. Thus, some DSS systems are forced to transmit an HD channel of data, as well as an SD version of the HD channel, so that the DSS SD receivers can receive and decode the transmission. This is a very expensive solution since it takes a complete SD channel bandwidth in addition to the HD channel bandwidth. Bandwidth is wasted since redundant information is transmitted. There is a need, therefore, for techniques for encoding and transmitting improved or enhanced signals which are also backward compatible with the prior standard, to avoid having to transmit redundant or extra channels of data.

SUMMARY

In the present invention, a method and apparatus are provided for encoding and decoding video signals. A progressive video bitstream is received which has reference frames and non-reference frames, each having an initial temporal reference in accordance with an initial frame sequence structure. The temporal references of the only the reference frames are remapped, by ignoring the non-reference frames. The reference frames are packetized with a base packet-identifier (PID) and the non-reference frames with an enhancement PID, to provide base and enhancement transport bitstreams, respectively.

DESCRIPTION OF THE PREFERRED EMBODIMENT

In the present invention, an MPEG-2 type encoding process is modified to provide an encoded bitstream that is backward-compatible with existing MPEG-2 DSS SD IRDs and which provides additional information to suitably modified decoders to provide higher quality video.

Figure 1:
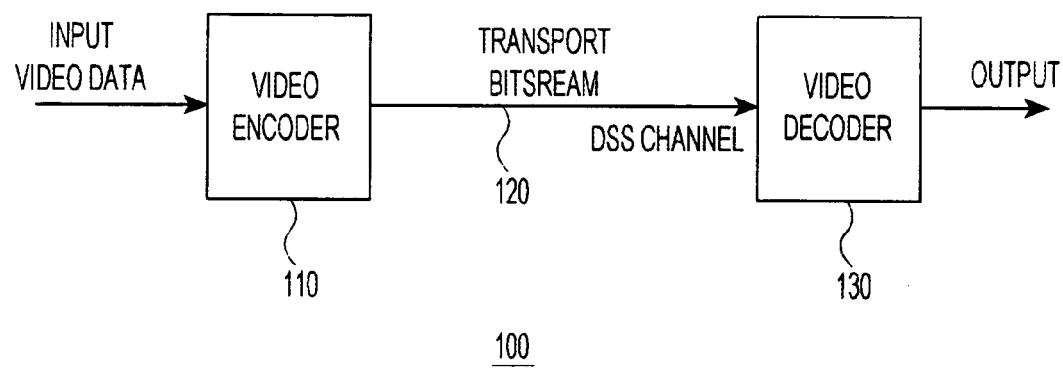
FIG. 1 shows a digital video system for encoding, transmitting, and decoding video image signals, according to a preferred embodiment of the present invention.

Referring now to FIG. 1, there is shown a digital video system 100 for encoding, transmitting, and decoding video image signals, according to a preferred embodiment of the present invention. Video encoder 110 receives an video stream from a video data source such as a video camera. This may be a high-quality, 59.94 Hz (fps) input video data stream. As described in further detail below with reference to FIG. 2, video encoder encodes this data with an encoder such as an MPEG-2 encoder to generate a progressive video bitstream. This may be, for example, a 59.94 Hz (fps) progressive bitstream. This bitstream is then split by further functional components of encoder 110, such as the transport encoder (transport IC), into two streams, a base stream and an enhancement stream, and transmitted over a communications medium such as DSS channel 120 as a transport bitstream.

The transport IC makes the base stream backward compatible with existing decoders, such as DSS SD IRDs, and compliant with MPEG-2 MP@ML syntax, in an embodiment. Thus, a standard, non-modified DSS SD IRD is able to receive the base stream portion of the compressed progressive video. The enhanced video transmission is thus transparent to non-upgraded SD receivers and decoders. That is, the enhanced video transmission is backward-compatible with the previous, existing SD format. A suitably modified MP@HL type video decoder and transport decoder can be used to decode the base and enhancement streams to provide high-quality progressive video. An HDTV or EDTV (enhanced definition television) decoding system may be used for this purpose, for example.

In an embodiment, the base stream has a frame rate of 29.97 Hz (fps), i.e. the SDTV rate. The enhancement stream, combined with the base stream, can be decoded by an EDTV decoder, for example, to provide a 59.94 Hz progressive bitstream for EDTV systems. Thus, the encoder 110 provides a combined stream having base and an enhancement streams. Together these form an enhanced transmission, which can be received and decoded by an enhanced receiver and decoder, such as HDTV or EDTV, to provide progressive video (e.g. 59.94 Hz). The base stream may be used by itself by an MP@ML type system, such as SDTV, to retrieve only the 29.97 Hz (fps) MP@ML video information.

Thus, a video decoder 130 receives the transport bitstream, and provides demodulation and decoding to provide some useful output, e.g. a display on a monitor (not shown). In one embodiment, video decoder 130 is a conventional DSS IRD, which extracts the base stream and decodes it to provide SDTV 29.97 fps interlaced video. In another embodiment, decoder 130 is an HDTV or EDTV decoder in accordance with the present invention, which extracts and decodes both the base and enhancement stream to provide 59.94 fps progressive video for EDTV applications.

In the following discussion, a DSS embodiment employing SCIDs is employed and reference is therefore made to SCIDs, although it will be understood that in general a PID may be utilized. In an embodiment, the elementary base stream is an MPEG-2 MP@ML video bitstream, having a GOP bitstream structure with the following encoded ordering:

I0 P1 P2 ... P14

In this GOP, M=1, N=15, and the GOP bitstream length in time is 15 frames/29.97 fps=0.5 sec. The time distance between two displayed frames=1/29.97 sec, which is the same interval as for NTSC video. In an embodiment, this elementary stream is packetized into a DSS transport stream with one SCID (SCID i).

The enhancement stream is not an MPEG-2 compliant video bitstream. In an embodiment, it consists of B frames only and has the following structure:

B0 B1 B2 B14

For the enhancement bitstream, as for the base bitstream, N=15. The time distance between two displayed frames is 1/29.97 sec. The enhancement bitstream is packetized into a DSS transport stream with a different SCID than that of the base bitstream (i.e., SCID j).

Figure 2:
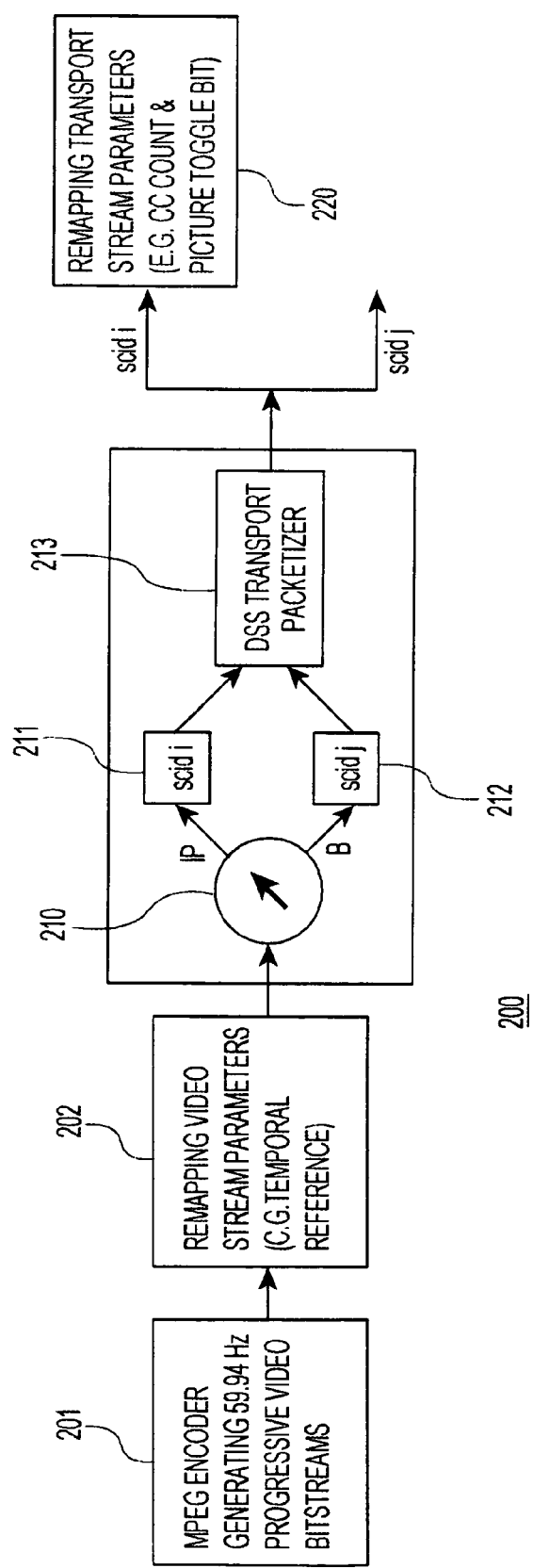
FIG. 2 is a flow diagram illustrating the encoding performed by the video encoder of the video system of FIG. 1.

Referring now to FIG. 2, there is shown a flow diagram 200 illustrating the encoding performed by video encoder 110 of video system 100, which generates the video transport bitstream transmitted via DSS channel 120. In an embodiment, video encoder 110 comprises an MPEG-2 encoder, which provides a 59.94 Hz progressive video bitstream (step 201). This progressive video bitstream has a GOP structure of M=2, N=30, with the following general GOP structure ordering:

B0 I1 B2 P3 B4 P5 B6 P7 B8 P9 B10 P11 B12 P13 B14 P15 B16 P17 B18 P19 B20 P21 B22 P23 B24 P25 B26 P27 B28 P29

Encoder 110 remaps the temporal reference of the reference (I and P) frames in the base stream as follows (step 202):

I1⇒I0
Pn⇒P(n−1)/2

The purpose of the remapping of the reference frames is so that the base stream, which will consist only of these reference frames, will have consecutive temporal references and be self-contained from the point of view of an MP@ML decoder, i.e. backward compatible with the MP@ML decoder despite the presence of the enhancement stream.

Figure 3:
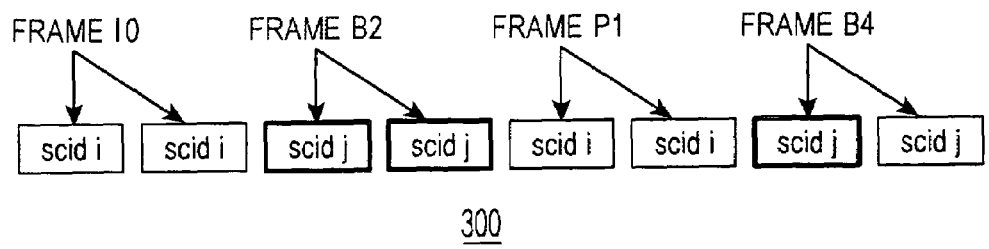
FIG. 3 illustrates the bitstream packetizing performed by a DSS transport packetizer of the video encoder of FIG. 1.

The transport IC of video encoder 110 then separates the I, P frames from the B frames (step 210), for the base and enhancement bitstreams, respectively, and assigns either SCID i or SCID j, respectively, to each packet of a particular frame (steps 211, 212). A DSS transport packetizer of video encoder 110 then packetizes the bitstreams as illustrated in FIG. 3 (step 213). As shown in FIG. 3, for example, the various packets of frame I0 (only two of which are illustrated in FIG. 3) are assigned SCID i.

Next, some of the transport stream parameters in the base bitstream are remapped (step 220) so as to make the base bitstream compliant with DSS transport specifications. The base and enhancement bitstreams, containing their respective SCIDs i, j, are then transported via DSS channel 120, where the packets are received by video decoder 130 which contains or is coupled to a satellite dish for receiving the DSS signals over the DSS channel 120, and which comprises an IRD. The IRD itself contains video/audio decoder circuits which perform transport extraction and decompression, i.e., a transport decoder and an MPEG video decoder.

Figure 4:
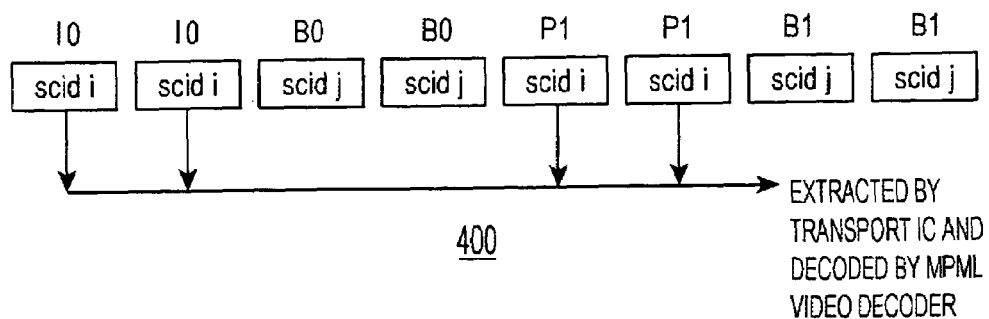
FIG. 4 illustrates the base stream-only decoding operation performed by a standard DSS video decoder of a system such as the system of FIG. 2.

If video decoder 130 is a standard MPEG-2 DSS compatible (MP@ML) decoder, it cannot decode the entire two-part bitstream to provide progressive video. However, because the enhanced bitstream is backward-compatible with existing MPEG-2 DSS type MP@ML decoders, decoder 130 is able to decode the base stream. Because the base stream is an MP@ML stream, DSS video decoder 130 is able to decode it to display it as a 59.94 Hz interlaced video sequence. This base stream decoding operation is illustrated in FIG. 4, where packets denoted SCID i are base stream packets and packets denoted SCID j are enhancement stream packets. As shown, the I and P frame-packets, which contain the SCID i, are extracted by the transport decoder circuitry (IC) of decoder 130, and then decoded by an MP@ML-compatible MPEG-2 decoder unit of decoder 130. For example, the two SCID i packets illustrated for frame 10, which are part of the base stream, as well as the two SCID i packets illustrated for frame P1, are extracted by the transport decoder IC and then decoded by an MP@ML video decoder to provide SDTV quality video.

Figure 5:
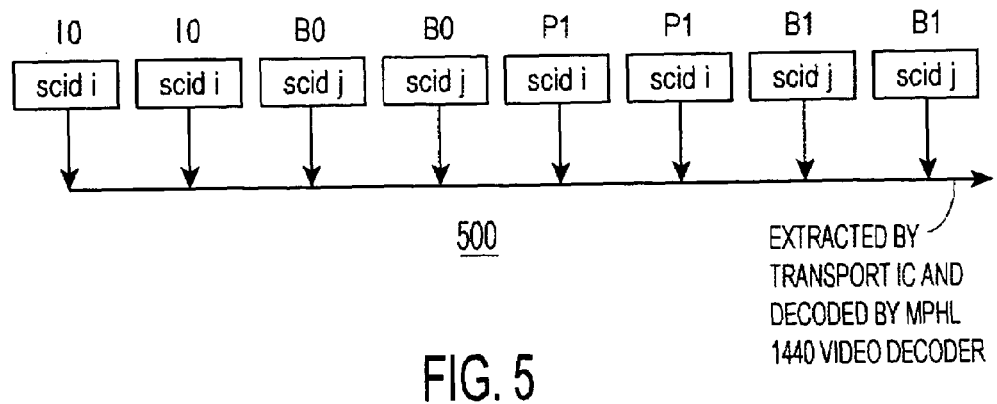
FIG. 5 illustrates the progressive video decoding operation performed by a modified DSS video decoder of a system such as the system of FIG. 2.

Alternatively, video decoder 130 may be a modified MP@HL-1440 DSS decoder having transport extraction and decoding units able to take full advantage of the entire two-part bitstream to provide progressive video. Thus, if video decoder 130 can decode 59.94 Hz progressive video sequences, it extracts both the base and enhancement streams and decodes them to provide 59.94 Hz progressive video, as illustrated in FIG. 5.

Thus, in the present invention, the encoding of the present invention ensures that the base stream looks just like individual SD streams so that SD IRDs can decode them, while specially-modified HD IRDs can decode both the base and enhancement streams to provide progressive video. Accordingly, the present invention provides a method to use a non-scalable MPEG syntax is to support a "scalable" transmission, without requiring special syntax to support the "scalability" (the special syntax would otherwise prevent non-modified SD IRDs from being able to decode data from the transmitted bitstream).

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A method for encoding video signals, comprising the steps of:
   receiving a progressive video bitstream comprising reference frames and non-reference frames, each having an initial temporal reference in accordance with an initial frame sequence structure, the reference frames excluding any B frames;
   remapping the temporal references of only the reference frames while ignoring the non-reference frames to provide backwards compatibility of the reference frames for a subsequent MP@ML decoding process despite a presence of the non-reference frames; and
   packetizing the reference frames with a base packet-identifier (PID) and the non-reference frames with an enhancement PID, to provide base and enhancement transport bitstreams, respectively, such that packets of the base transport bitstream are capable of being extracted based on the base PID and decoded in the subsequent MP@ML decoding process to provide an MP@ML decoded video bitstream suitable for display on standard definition television ("SDTV") systems, and such that the packets of the base transport bitstream are capable of being extracted based on the base PID and packets of the enhancement transport bitstream are capable of being extracted based on the enhancement PID and combined in a subsequent MP@HL decoding process to provide an MP@HL decoded video bitstream suitable for display on high definition television ("HDTV") systems.

2. The method of claim 1 wherein only packets having the base PID are extracted and decoded to provide an MP@ML decoded video bitstream.

3. The method of claim 1 wherein packets having the base PID and packets having the enhancement PID are extracted and decoded to provide the base and enhancement bitstreams, respectively, which are combined to provide an MP@HL decoded video bitstream.

4. The method of claim 1, wherein said reference frames comprise I and P frames and said non-reference frames comprise B frames.

5. The method of claim 1, wherein each PID is a service channel identifier (SCID).

6. The method of claim 1, wherein the base transport bitstream is backwards compatible with a MP@ML decoder irrespective of a presence of the enhancement layer.

7. A method for encoding video signals, comprising the steps of:
   receiving a progressive video bitstream comprising reference frames and non-reference frames, each having an initial temporal reference in accordance with an initial frame sequence structure, the reference frames excluding any B frames;
   remapping the temporal references of only the reference frames so that the reference frames are all consecutively numbered while ignoring the non-reference frames to provide backwards compatibility of the reference frames for a subsequent MP@ML decoding process despite a presence of the non-reference frames; and
   packetizing the reference frames with a base packet-identifier (PID) and the non-reference frames with an enhancement PID, to provide base and enhancement transport bitstreams, respectively, such that packets of the base transport bitstream are capable of being extracted based on the base PID and decoded in the subsequent MP@ML decoding process to provide an MP@ML decoded video bitstream suitable for display on standard definition television ("SDTV") systems, and such that the packets of the base transport bitstream are capable of being extracted based on the base PID and packets of the enhancement transport bitstream are capable of being extracted based on the enhancement PID and combined in a subsequent MP@HL decoding process to provide an MP@HL decoded video bitstream suitable for display on high definition television ("HDTV") systems.

8. The method of claim 7 wherein said reference frames consist of I and P frames and said non-reference frames consist of B frames.

9. The method of claim 7 wherein each PID is a service channel identifier (SCID).

10. The method of claim 7, wherein the base transport bitstream is backwards compatible with a MP@ML decoder irrespective of a presence of the enhancement layer.

11. An apparatus for encoding video signals, comprising:
   a remapper for receiving a progressive video bitstream comprising reference frames and non-reference frames, each having an initial temporal reference in accordance with an initial frame sequence structure, the reference frames excluding any B frames, and for remapping only the temporal references of the reference frames while ignoring the non-reference frames to provide backwards compatibility of the reference frames for a subsequent MP@ML decoding process despite a presence of the non-reference frames;
   a transport packetizer for packetizing the reference frames with a base packet-identifier (PID) and the non-reference frames with an enhancement PID, to provide base and enhancement transport bitstreams, respectively, such that packets of the base transport bitstream are capable of being extracted based on the base PID and decoded in the subsequent MP@ML decoding process to provide an MP@ML decoded video bitstream suitable for display on standard definition television ("SDTV") systems, and such that the packets of the base transport bitstream are capable of being extracted based on the base PID and packets of the enhancement transport bitstream are capable of being extracted based on the enhancement PID and combined in a subsequent MP@HL decoding process to provide an MP@HL decoded video bitstream suitable for display on high definition television ("HDTV") systems.

12. The apparatus of claim 11 wherein said decoder is an MP@ML decoder for extracting and decoding only packets having the base PID to provide an MP@ML decoded video bistream.

13. The apparatus of claim 11 wherein said decoder is an MP@HL decoder for extracting and decoding packets having both the base PID and the enhancement PID to provide the base and enhancement bitstreams for combining to provide an MP@HL decoded video bistream.

14. The apparatus of claim 11, wherein said reference frames comprise I and P frames and said non-reference frames comprise B frames.

15. The apparatus of claim 11, wherein each PID is a service channel identifier (SCID).

16. The apparatus of claim 11, wherein the base transport bitstream is backwards compatible with a MP@ML decoder irrespective of a presence of the enhancement layer.

17. An apparatus for encoding video signals, comprising:
a remapper for receiving a progressive video bitstream comprising reference frames and non-reference frames, each having an initial temporal reference in accordance with an initial frame sequence structure, the reference frames excluding any B frames, and for remapping the temporal references of only the reference frames while ignoring the non-reference frames so that the reference frames are all consecutively numbered and to provide backwards compatibility of the reference frames for a subsequent MP@ML decoding process despite a presence of the non-reference frames; and a transport packetizer for packetizing the reference frames with a base packet-identifier (PID) and the non-reference frames with an enhancement PID, to provide base and enhancement transport bitstreams, respectively, such that packets of the base transport bitstream are capable of being extracted based on the base PID and decoded in the subsequent MP@ML decoding process to provide an MP@ML decoded video bitstream suitable for display on standard definition television ("SDTV") systems, and such that the packets of the base transport bitstream are capable of being extracted based on the base PID and packets of the enhancement transport bitstream are capable of being extracted based on the enhancement PID and combined in a subsequent MP@HL decoding process to provide an MP@HL decoded video bitstream suitable for display on high definition television ("HDTV") systems.

18. The apparatus of claim 17 wherein said reference frames consist of I and P frames and said non-reference frames consist of B frames.

19. The apparatus of claim 17 wherein each PID is a service channel identifier (SCID).

20. The apparatus of claim 17, wherein the base transport bitstream is backwards compatible with a MP@ML decoder irrespective of a presence of the enhancement layer.

* * * * *